United States Patent
Bar-Tor et al.

(10) Patent No.: US 8,848,544 B2
(45) Date of Patent: Sep. 30, 2014

(54) EVENT CORRELATION USING NETWORK DATA FLOW SIMULATION OVER UNMANAGED NETWORK SEGMENTS

(75) Inventors: Chen Bar-Tor, Petach Tikva (IL); Harold Lowenthal, Tel-Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 1946 days.

(21) Appl. No.: 11/937,117

(22) Filed: Nov. 8, 2007

(65) Prior Publication Data

US 2009/0122710 A1    May 14, 2009

(51) Int. Cl.
*H04L 12/26* (2006.01)
*H04L 12/24* (2006.01)

(52) U.S. Cl.
CPC .............. *H04L 41/145* (2013.01); *H04L 41/14* (2013.01); *H04L 41/0631* (2013.01); *H04L 41/12* (2013.01)
USPC ............................ 370/250; 709/223; 709/224

(58) Field of Classification Search
USPC ............................ 709/223–224; 703/1, 13, 21
See application file for complete search history.

(56) References Cited

U.S. PATENT DOCUMENTS

| 7,043,661 B2 * | 5/2006 | Valadarsky et al. ............... 714/4 |
| 7,069,480 B1 | 6/2006 | Levy et al. |
| 7,284,048 B2 | 10/2007 | Jakobson et al. |
| 7,293,287 B2 | 11/2007 | Fischman et al. |
| 7,356,736 B2 * | 4/2008 | Natvig ........................ 714/38.12 |
| 2004/0078683 A1 | 4/2004 | Bula et al. |
| 2006/0015603 A1 * | 1/2006 | Jakobson et al. .............. 709/223 |
| 2006/0109793 A1 * | 5/2006 | Kim et al. ...................... 370/250 |
| 2008/0056223 A1 * | 3/2008 | Manser ......................... 370/342 |
| 2008/0262991 A1 * | 10/2008 | Kapoor et al. .................. 706/20 |

OTHER PUBLICATIONS

Crowell, C., "Event Correlation and Root Cause Analysis" White Paper (2004) 15 pages.

* cited by examiner

*Primary Examiner* — Andrew Goldberg
(74) *Attorney, Agent, or Firm* — Hickman Palermo Truong Becker Bingham Wong LLP; Daniel D. Ledesma

(57) ABSTRACT

A network simulator comprises a virtual network and event correlation logic. The virtual model models a network that comprises a managed portion and an unmanaged portion. The event correlation logic, when executed, is operable to perform receiving first data indicating that an event occurred in the network. A network flow is initiated at a source virtual network element (VNE) corresponding to the source network device toward a destination VNE corresponding to the destination network device. A first VNE is communicatively coupled to a particular VNE corresponding to an unmanaged portion of the network. A logical topological link to a second VNE is identified and traversed. Second data that is associated with the unmanaged portion of the network is identified. As a result, the first data is stored in association with the second data.

26 Claims, 5 Drawing Sheets

EVENT CORRELATION USING NETWORK DATA FLOW SIMULATION OVER UNMANAGED NETWORK SEGMENTS

TECHNICAL FIELD

The present disclosure generally relates to correlating events in a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Event correlation technology is commonly used by network management systems (NMS) to enhance various diagnostic and other analytic operations. A purpose of correlating events in a network is to determine whether events are related to each other. By grouping related events, the management of a network becomes less daunting. For example, 100 events occur in a network in a ten-minute span. If a network administrator could determine that the 100 events could be partitioned into only three groups of related events, then the task of analyzing three groups of events is a significant reduction in work compared to analyzing 100 events in isolation.

A NMS may employ several techniques to correlate network events, such as a physical link between two routers going down. Event correlation techniques include geographical area correlation, which attempts to correlate events based on geographical proximity of events, time-based correlation, which relies on time stamp of events to achieve correlation, and rule-based correlation, which allows case by case correlation.

Another such technique is topology-based correlation, which is considered to be a highly accurate and reliable approach in correlating network events. According to one topology-based approach, event correlation is performed using a computer system or application that interacts with a "virtual network," which is an in-memory model of an actual network. The virtual network includes virtual network elements (VNEs) that represent corresponding network elements (such as switches and routers) in the actual network. The virtual network also models network topology and regular functions of the actual network, such as network services.

In order to perform event correlation, an NMS simulates network traffic flows within the virtual network. Topology-based event correlation is performed by simulating these network traffic flows (referred to herein as "flows") through the topological links among VNEs.

For diagnostic purposes, such as root cause analysis (RCA), the topology of interest is usually at the physical level, where actual physical network links are traversed. For that purpose, the virtual network models the actual physical topology over which a NMS simulates flows. A NMS may also maintain and use logical topology links to enable traversal of large network segments in a single hop.

A network service provider (or simply "provider") may provide services to its customers that require connectivity over the provider's network as well as over network segments that are not owned and/or are not managed by the provider. Segments of a network that are owned and/or managed by a provider are referred to herein as "managed segments" with respect to that provider. Network segments that are not owned and/or not managed by a provider are referred to herein as "unmanaged segments" with respect to that provider.

For many analytic and monitoring purposes, the unmanaged segment can still be modeled with a single VNE (referred to herein as a "cloud VNE"). However, a cloud VNE is only visible as a layer 3 (IP) element in the seven-layer Open Systems Interconnect (OSI) model of network elements. A cloud VNE may represent elements that are layers 1, 2, and 3. A cloud VNE is technology-dependent on whether the cloud VNE can be implemented: if enough information exists at the edges of an unmanaged segment, then creating a cloud VNE for that unmanaged segment is possible; otherwise, creating a cloud VNE for that unmanaged segment is impossible.

The physical and logical structure of an unmanaged segment is unknown to the NMS. The use of a cloud VNE is also limited because a service provider using a NMS typically chooses not to deploy a cloud VNE for various reasons. When a cloud VNE is not deployed, simulating a flow by traversing a path through both managed segments and one or more unmanaged segments is not possible, without the full mapping of the physical topology across the complete network. Even in some cases where a cloud VNE is present, traversal of the cloud VNE may not be possible.

DESCRIPTION OF EXAMPLE EMBODIMENTS

Figure 1A:
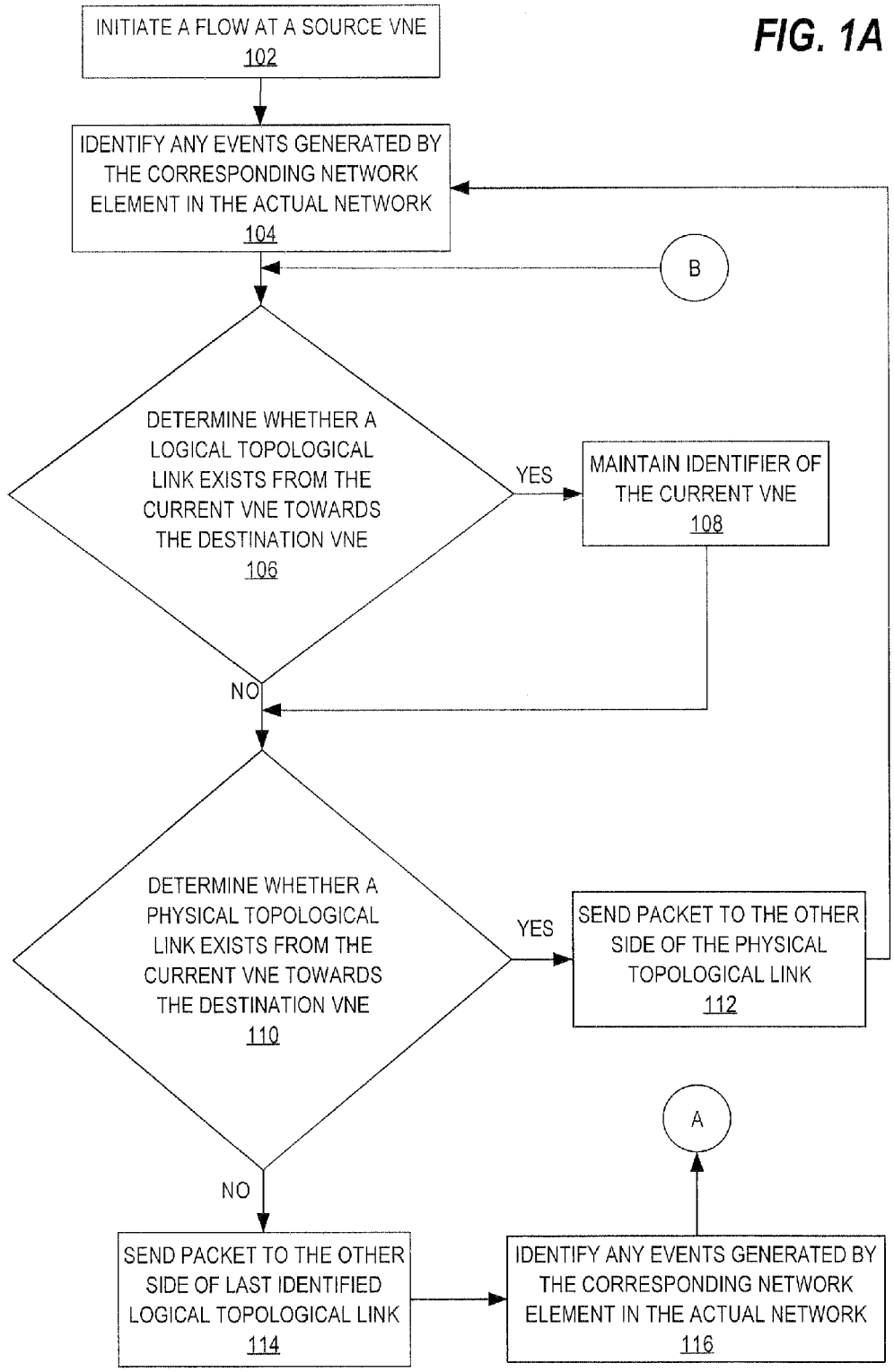
FIGS. 1A-B depict a process for a virtual packet traversing a virtual network using physical and logical topological links, according to an embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Virtual Network
   2.2 Network Simulation Flow
   2.3 Logical Topological Links
   2.4 Life-Cycle of a Network Simulation Flow
   2.5 Progression of a Network Simulation Flow
   2.6 Example A
   2.7 Example B
   2.8 Additional Benefits 3.0 Implementation Mechanisms—Hardware Overview
4.0 Extensions and Alternatives

1.0 General Overview

Event correlation in a virtual network is described. In an embodiment, a network simulator comprises a virtual network and event correlation logic. The virtual network models an actual network that comprises a managed portion and an unmanaged portion. The virtual network comprises a plurality of virtual network elements (VNEs) that correspond to a plurality of network elements in the network. The event correlation logic, when executed, is operable to perform: (1) receiving first data that indicates an event occurred in the network; (2) initiating a network flow at a source VNE corresponding to a source network device toward a destination VNE corresponding to a destination network device; (3) traversing one or more physical topological links between the source VNE and the destination VNE until no further progression along a physical link is possible; (4) determining that a first VNE is communicatively coupled to a particular VNE in a portion of the virtual network that corresponds to the unmanaged portion of the network and that a physical topological link from the first VNE toward the destination VNE is not available; (5) in response to the determining that the first VNE is communicatively coupled to the particular VNE and that a physical topological link from the first VNE toward the destination VNE is not available, identifying and traversing a logical topological link to a second VNE; (6) after traversing the logical topological link to the second VNE, identifying second data that is associated with the unmanaged portion of the network; and (7) storing, in association, the first data and the second data. Second data may be event data that the second VNE generates in response to an event that occurred in the unmanaged portion of the network.

2.0 Structural and Functional Overview

The inability of a network simulation flow to traverse unmanaged network segments because the physical topology of unmanaged network segments is unknown is referred to as the "unmanaged network segment traversal problem." In an embodiment, the unmanaged network segment traversal problem is resolved by the use of an intelligent network simulation flow that traverses virtual network elements (VNEs) in a virtual network with the intelligent selection of both physical and logical topological links. Thus, event correlation over unmanaged network segments may be achieved by a network simulation flow that traverses both logical and physical topological links rather than physical topological links only.

2.1 Virtual Network

According to an embodiment, a network simulator comprises a virtual network that models an actual network. For example, each network element in the actual network has a corresponding VNE in the virtual network. Each VNE may simulate the functionality of its corresponding network element in the actual network. Thus, each VNE may be capable of performing logical operations equivalent to routing and/or switching decisions performed by the corresponding network element in the actual network. Also, each VNE may maintain the same historical information as its corresponding network element in the actual network.

For example, when a link becomes unavailable, a router to which the link connects updates its routing table to indicate that the link is unavailable and that certain logical links to other routers are also unavailable. A VNE that corresponds to the router also updates its routing table accordingly. However, the VNE may maintain routing information at a point in time before the link became unavailable. Thus, when a packet traverses the virtual network and arrives at the VNE, the VNE may determine, based on historical information, that the VNE was logically and/or physically linked to one or more other VNEs at a time before the actual logical link became unavailable.

2.2 Network Simulation Flow

A network simulation flow refers to the traversal of a virtual packet or frame across VNEs in a virtual network using well-defined switching and/or forwarding logic. A network simulation flow progresses between different VNEs using the physical topology connections discovered between the different VNEs. If a VNE must select a single topological link from multiple possible topological links, the decision may be made using the same logic that is used for switching and/or forwarding in the actual network.

A virtual packet (referred to hereinafter simply as a "packet") is an object that is created at a VNE and that represents information sent from the source device of an actual network flow. The packet is sent from one VNE to another VNE using the topological links available. The decision on which VNE is selected as the next hop is based on the same switching and forwarding logic as is used in the actual network.

In and of itself, a network simulation flow has no use because such a flow does not carry any data in its packet. However, different applications may use a network simulation flow to transport information relevant to the application in the packet that is transiting in the network flow. For example, fault correlation applications may carry a root cause alarm (RCA) identifier in the packet. As another example, path analysis applications may collect information during the progression of the simulated flow and store that information in the packet as the packet traverses through different VNEs.

2.3 Logical Topological Links

Because a transition from one VNE to another VNE is performed across a physical topological link, in order to transition from the source VNE to the destination VNE, a mapping of the physical topological links between the source VNE and the destination VNE is needed. However, VNEs typically only represent managed network elements. As a result, if any part of the network is unmanaged, then VNEs would be unable to establish the needed physical topological connections between some of the VNEs.

In an embodiment, one or more VNEs in a virtual network maintain information representing logical topological links to other VNEs. Logical links in the actual network may be based on a routing protocol or a tunneling protocol. A first VNE may be only logically linked to, rather than directly connected to, a second VNE. Thus, the first VNE may be logically linked to the second VNE which is many physical "hops" away from the first VNE. The first VNE need not maintain information of any intermediate network element along the physical topological path. Therefore, the intermediate network elements may be unmanaged.

In an embodiment, a packet traverses a virtual network from one VNE to another VNE along one or more logical topological links, thereby bypassing complete network segments, some of which may be unmanaged segments.

In an embodiment, a packet traverses only physical topological links, unless a physical topological link cannot be traversed. One reason for preferring to traverse physical topological links over logical topological links is because the most information can be derived from traversing as many VNEs as possible along a flow. For example, some VNEs may include information about events that were generated by the corresponding network elements in the actual network. Because some network segments may be unmanaged, a packet may potentially arrive at a VNE that does not represent its final destination and that represents an unmanaged network element or network segment. When a packet arrives at such a VNE, the network simulator determines that the flow may continue through one or more logical topological links in order to reach the destination VNE.

In an embodiment, VNEs maintain as many physical topological links (corresponding to the actual physical links in the actual network) as there are available, as well as logical topological links based on information held in the VNE, such as routing protocol associations. As a packet progresses along a flow, the packet maintains a record of the identifier of the last VNE that was traversed and that holds a logical topological link towards the destination VNE.

In various embodiments, any component of a network simulator may perform the steps of determining the path along which a packet may traverse, sending the packet from one VNE to another VNE, etc. To illustrate a clear example, the discussion herein refers to VNEs performing such steps.

2.4 Life-Cycle of a Network Simulation Flow

In an embodiment, a general life-cycle of a flow comprises the following steps. A packet is created at a source VNE. The packet includes an identifier of a destination VNE and the flow is initiated. The source VNE attempts to send the packet to the next hop VNE using one of its physical topological links. The process repeats until the packet has reached the destination VNE. The flow then terminates and the application that invoked the flow performs one or more actions. For example, during the flow, the packet may have traversed numerous VNEs whose corresponding network elements in the actual network generated events. For each such VNE, the information about the corresponding event is stored in the packet. The application that invoked the flow may correlate an event identified in the packet with each other event identified in the packet. A flow may terminate by forwarding the results of the flow to the source VNE that initiated the flow.

2.5 Progression of a Network Simulation Flow

Figure 1B:
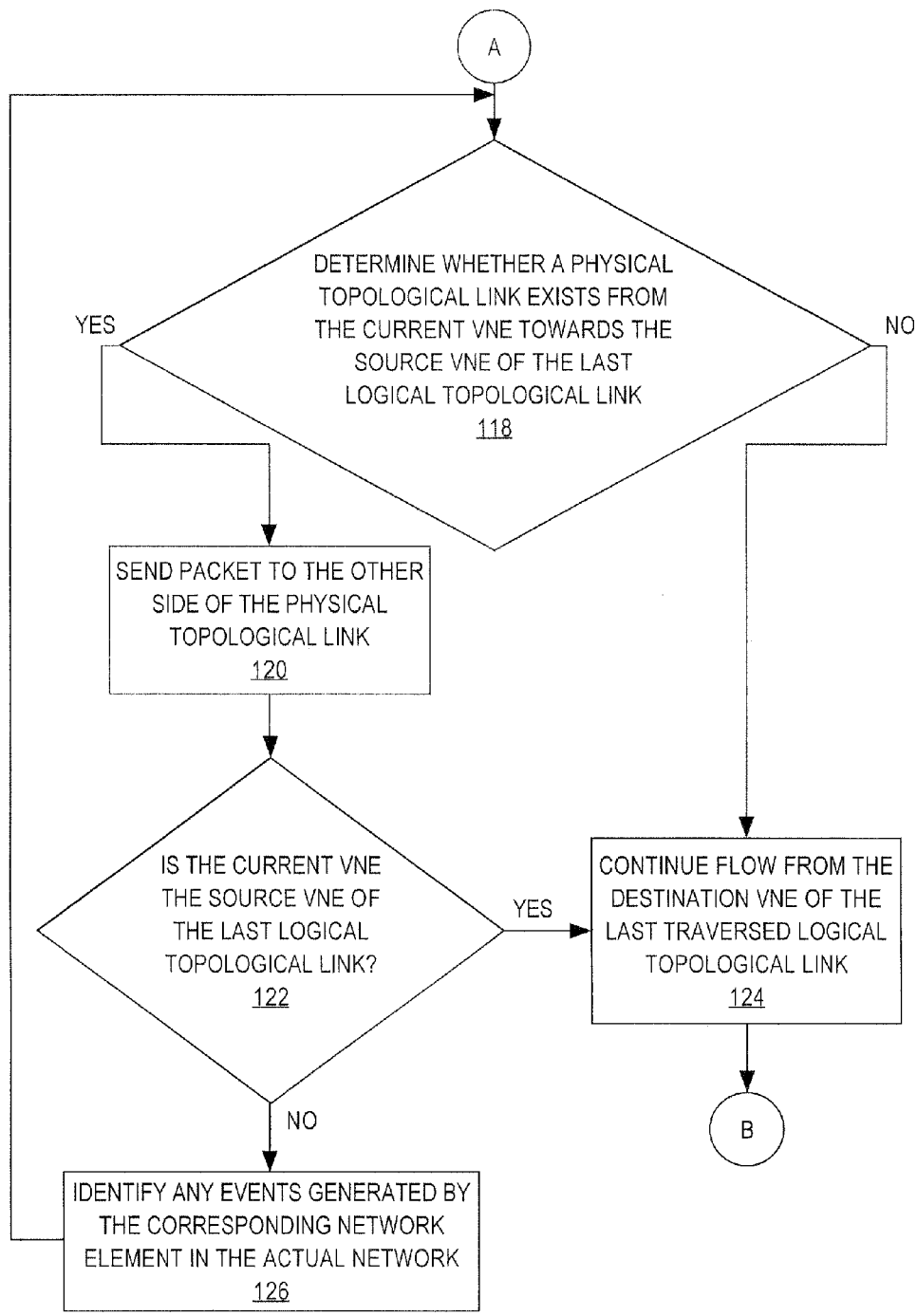

In an embodiment, the progression of a flow through a virtual network with an unmanaged segment comprises the following steps, depicted in FIG. 1A and FIG. 1B. At step 102, in response to an event in the actual network, a flow initiates at a source VNE. The VNE that is in current "possession" of a packet is referred to as the "current VNE." Thus, initially, the source VNE is the current VNE.

At step 104, the current VNE identifies any events that were generated by the corresponding network element in the actual network. For example, in many situations, the network element corresponding to the source VNE generates an event. As a result, the packet at the source VNE stores information about this event before being sent to another VNE. After the packet traverses the virtual network from the source VNE to the destination VNE, the events identified during the flow may be correlated.

At step 106, the current VNE determines whether there is a logical topological link from the current VNE toward the destination VNE, which link may be to the destination VNE. If so, then, at step 108, the current VNE stores the identifier of the current VNE in the packet without sending the packet across the logical topological link.

At step 110, the current VNE determines whether there is a physical topological link from the current VNE towards the destination VNE. If so, then, at step 112, the current VNE sends the packet the VNE across the other side of the physical topological link. The process then proceeds to step 104.

However, if the physical topological link is not present, then, at step 114, the packet is sent from the last identified VNE to the VNE across the other side of the last identified logical topological link, which VNE becomes the "current" VNE. The last identified VNE may be the current VNE or may be a VNE that was traversed before the current VNE.

At step 116, the current VNE identifies any events that were generated by the corresponding network element in the actual network. The process then proceeds to FIG. 1B.

At step 118, the current VNE determines whether a physical topological link exists from the current VNE towards the source VNE of the last logical topological link that was traversed (i.e., in step 114).

If so, then, at step 120, the current VNE sends the packet to that source VNE. If a physical topological link does not exist from the current VNE towards that source VNE, then, at step 124, the flow of the packet continues from the destination VNE of the last logical topological link that was traversed (i.e., in step 114). The process then proceeds to step 106.

At step 122, the current VNE determines whether the current VNE is the source VNE of the last topological link that was traversed. If so, then the process proceeds to step 124. If not, then, at step 126, the current VNE identifies any events that were generated by the corresponding network element in the actual network. The process then proceeds to step 118.

Thus, according to FIG. 1A and FIG. 1B, as long as a packet can traverse from one VNE to another VNE using physical topological links, the packet continues to do so. Also, as long as a packet traverses from one VNE to another VNE using logical topological links, it is not necessary to maintain the physical next hop VNE of the flow, thereby bypassing unmanaged network segments.

2.6 Example A

Figure 2:
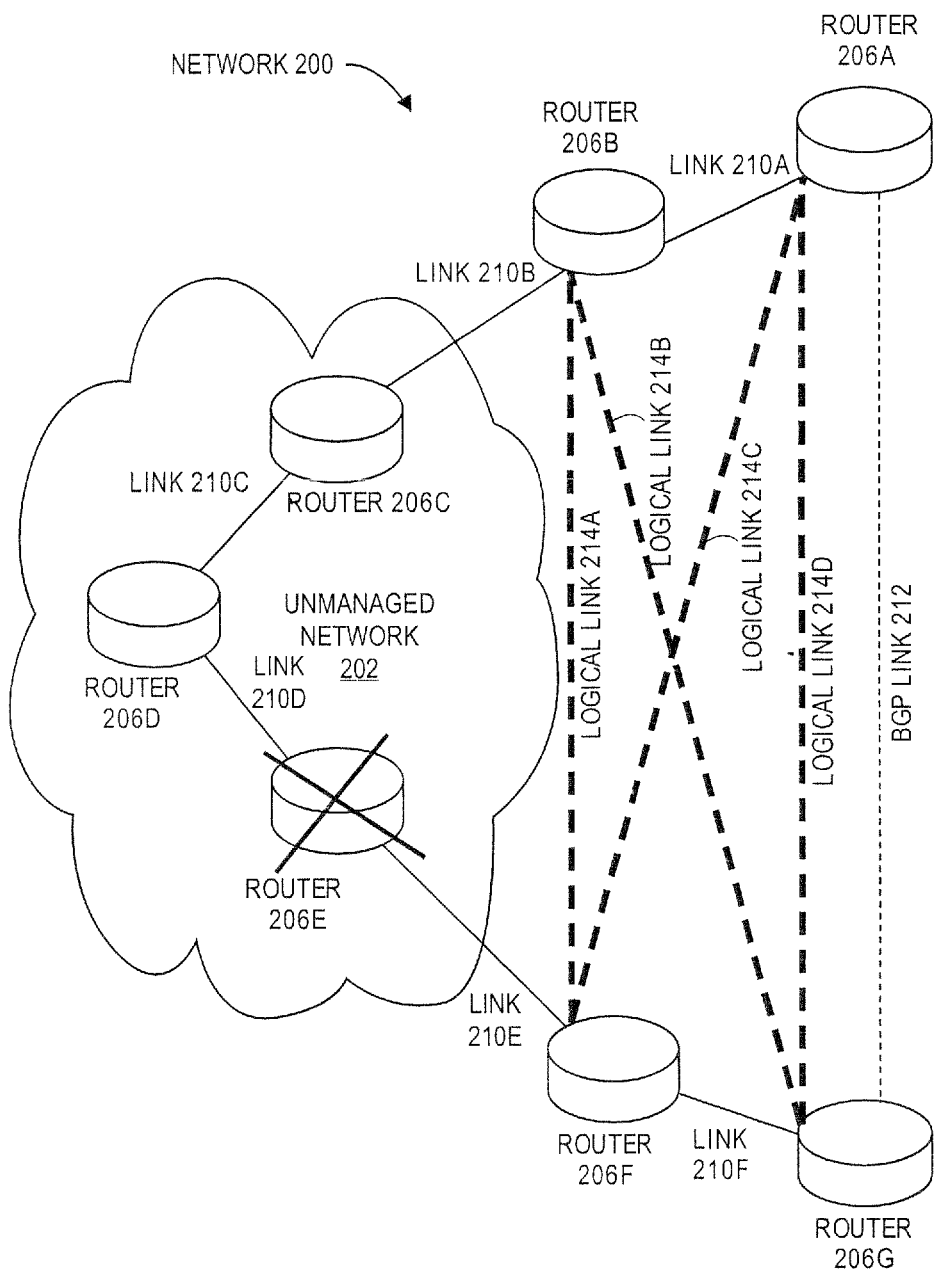
FIG. 2 depicts an example scenario in which a packet traverses one or more logical topological links in a virtual network in order to correlate at least two events, according to an embodiment.

FIG. 2 depicts an example scenario in which a packet traverses one or more logical topological links in a virtual network in order to correlate at least two events, according to an embodiment. FIG. 2 depicts a network 200. In various embodiments, network 200 comprises an IP network that uses a dynamic routing protocol, such as RIP (Routing Information Protocol) or OSPF (Open Shortest Path First) to route packets in the network.

Network 200 comprises routers 206A-G and physical links 210A-F that interconnect routers 206A-G. Network 200 may comprise additional routers, links, and other network elements not shown. Network 200 also comprises an unmanaged segment, which is depicted as unmanaged network 202. Unmanaged network 202 includes routers 206C, 206D, and 206E. Routers 206A, 206B, 206F, and 206G are owned and/or managed by a network service provider ("provider"). The provider might not know anything about the physical topology of unmanaged network 202. Thus, the only information that the provider might know about unmanaged network 202 is that link 210B connects router 206B with unmanaged network 202 and link 210E connects router 206F with unmanaged network 202.

Some of routers 206A-G are not only directly (physically) linked to each other, but are also logically linked to each other. For example, router 206A is logically connected to router 206G via a BGP (Border Gateway Protocol) link 212. Routers 206A, 206B, 206F and 206G are logically linked with each other via logical links 214A-D. Logical links 214A-D may be determined based on any routing protocol, such as RIP or OSPF.

In an embodiment, a network simulator includes a virtual network that models network 200. For example, the physical topology of network 200 is reflected in the topology of the virtual network. Thus, the virtual network comprises a VNE for each network element in the managed segment of network 200 and a cloud VNE for unmanaged network 202. The routing/switching logic of each VNE may be equivalent to the routing/switching logic of the corresponding network element in network 200. For example, given a particular address, router 206A will forward a packet on a particular link. Given the same address, the VNE that corresponds to router 206A will also route a packet on a link that corresponds to the particular link, no matter how many links connect to router 206A.

In the example scenario depicted in FIG. 2, router 206E is switched off. As a result, link 210E becomes unavailable and router 206F generates an event (e.g., a "port down" alarm) to a NMS that is associated with the network simulator. Another result of router 206E being switched off is BGP link 212 becoming unavailable. Both routers 206A and 206G generate an event that BGP link 212 is unavailable. Other embodiments may initiate a flow in response to events other than a link becoming unavailable. Examples of such events may include the removal of routing entries from a VRF and/or regular routing tables, a routing protocol (e.g., OSPF or BGP) down event, and a tunneling protocol (e.g., GRE) down event. The logical links 214A-D also may go down as a result of link 210E becoming unavailable, and each of routers A, B, F, and G may generate an event about those logical links going down.

For purposes of illustrating a clear example, the present discussion focuses only on routers 206A, 206G. The network simulator determines which VNE of the VNEs that correspond to router 206A and router 206G will initiate a network simulation flow (hereinafter "flow"). Hereinafter, reference to a VNE that corresponds to a network element in the actual network precedes the name of the network element with a "VNE." Thus, for example, the VNE that corresponds to router 206A is referred to as "VNE router 206A."

Under previous techniques, if VNE router 206A initiates the flow, then the flow will stop at VNE router 206B because the virtual network does not know the topology of unmanaged network 202 (e.g., the identity of router 206C). Therefore, the event from router 206A and the event from router 206F will not correlate.

In an embodiment, VNE router 206A initiates a flow by generating a virtual packet (referred hereinafter as "packet") and sending the packet to VNE router 206B. VNE router 206B determines that a logical topological link corresponding to logical link 214B (referred to hereinafter as VNE logical link 214B) exists between VNE router 206B and VNE router 206G. The identity of VNE router 206B is saved (e.g., in the packet). VNE router 206B then determines that no physical topological link from VNE router 206B toward VNE router 206G exists where the next hop for the packet would be a known VNE router (i.e., because nothing is known about the physical topology of unmanaged network 202). Consequently, VNE router 206G receives the packet via VNE logical link 214B. Another flow is initiated at VNE router 206G toward the IP source of VNE logical link 214B, which is VNE router 206B.

Thus, the packet traverses VNE link 210F to arrive at VNE router 206F. VNE router 206F determines, based on the identity of VNE router 206B, that the packet should be sent on VNE link 210E. However, VNE link 210E is unavailable, which is one of the events received previously. As a result of the foregoing, the event from router 206F (i.e., associated with link 210E) is correlated with the event from router 206A (i.e., associated with BGP link 212).

2.7 Example B

Figure 3:
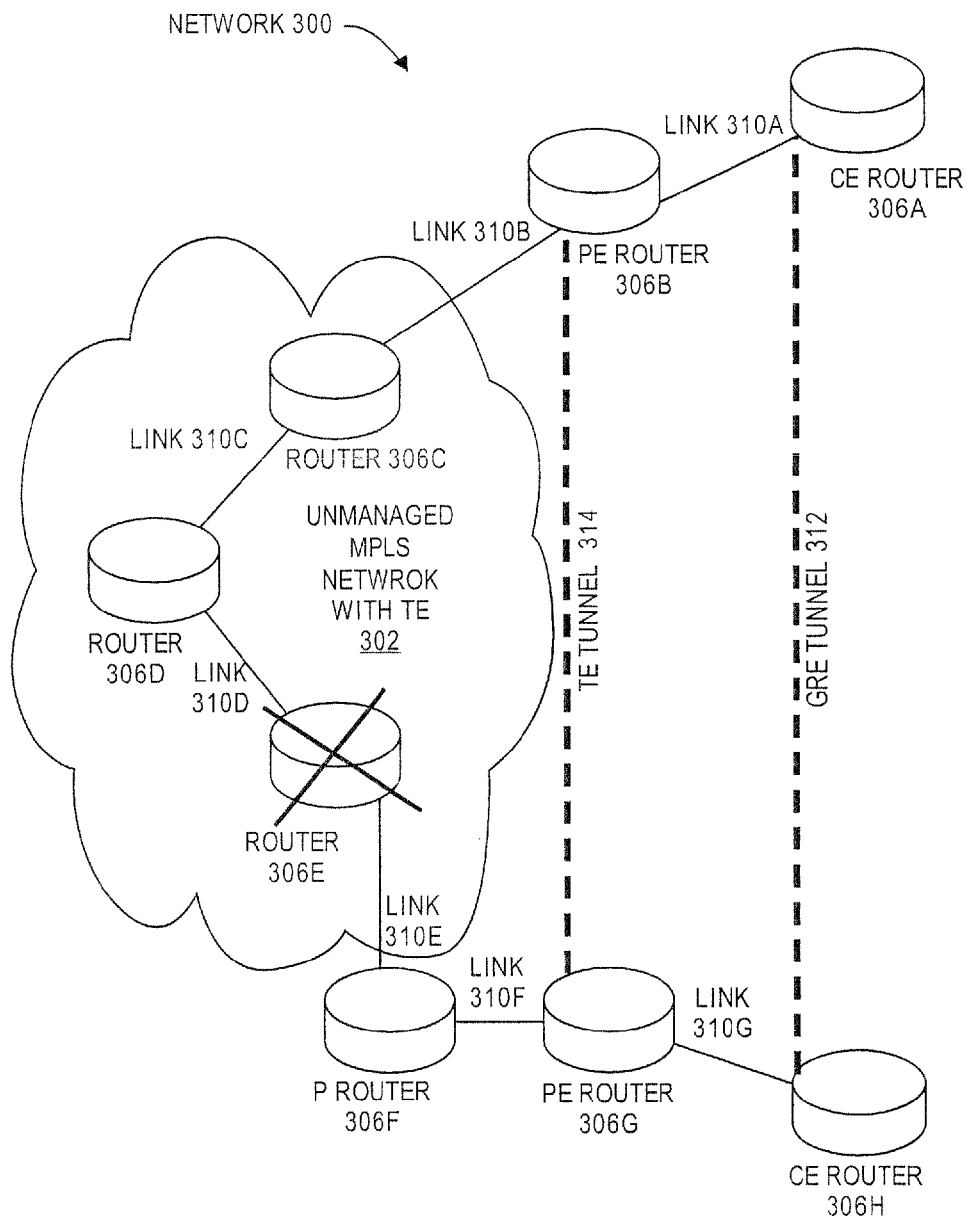
FIG. 3 depicts another example scenario in which a packet traverses one or more logical topological links in a virtual network in order to correlate three events, according to an embodiment.

FIG. 3 depicts another example scenario in which a packet traverses one or more logical topological links in a virtual network in order to correlate three events, according to an embodiment. Network 300, depicted in FIG. 3, comprises routers 306A-306H. Routers 306A and 306H are customer edge (CE) routers. A CE router is a router on the premises of a customer of a network service provider. A CE router provides an Ethernet interface between the customer's LAN and the service provider's core network. Routers 306B and 306G are provider edge (PE) routers while router 306F is a provider (P) router. CE routers, P routers, and PE routers are components in an MPLS (multiprotocol label switching) architecture. P routers are located in the core of the provider or carrier's network. PE routers are located at the edge of the provider's network. CE routers connect to PE routers and PE routers connect to other PE routers over P routers. CE routers have no knowledge of the underlying protocols (e.g., MPLS) in the core network.

According to FIG. 3, router 306E is taken offline in unmanaged network 302, which is an MPLS network with traffic engineering. As a result of router 306E being taken offline, P router 306F generates an event that link 210E is unavailable. Also, PE router 306B generates an event that TE (traffic engineering) tunnel 314 is unavailable. Additionally, CE router 306A generates an event that GRE (generic routing encapsulation) tunnel 312 is unavailable. At this point, it is important to correlate all three events.

A virtual network models network 300 and includes a VNE for each router in the managed portion of network 300 and a cloud VNE for unmanaged network 302. A flow is initiated at VNE CE router 306A (referred to hereinafter as the "source VNE") to traverse the virtual network toward VNE CE router 306H (referred to hereinafter as the "destination VNE"). The source VNE determines that logical topological link (i.e., VNE GRE tunnel 312) connects the source VNE with VNE CE router 306H. The source VNE stores an identifier of the source VNE in a packet. The source VNE determines that a physical topological link (i.e., VNE link 310A) connects the source VNE with a router (i.e., VNE router 306B) towards the destination VNE. The source VNE sends the packet to VNE PE router 306B.

VNE PE router 306B determines that a logical topological link (i.e., VNE TE tunnel 314) connects VNE PE router 306B and VNE PE router 306G. VNE PE router 306B stores an identifier of VNE PE router 306B in the packet. VNE PE router 306B determines that a physical topological link does not connect VNE PE router 306B with a known router towards the destination VNE because the only path to the destination VNE is through unmanaged network 302. VNE PE router 306B sends the packet to VNE PE router 306G over VNE TE tunnel 314.

VNE PE router 306G receives the packet and uses the latest identifier (i.e., of VNE PE router 306B) stored therein to traverse network 300 back toward VNE PE router 306B. VNE PE router 306G sends the packet to VNE P router 306F over VNE link 310F. VNE P router 306F determines that the corresponding network element in the actual network (i.e. P router 306F) generated an event about link 310E becoming unavailable. This information is stored in the packet.

VNE P router 306F, in attempting to send the packet toward VNE PE router 306, determines that a physical topological link does not connect VNE P router 306F with known router towards VNE PE router 306B. Therefore, the flow continues towards the destination VNE from the destination VNE of the logical topological link that was most recently traversed (i.e., VNE PE router 306G. VNE PE router 306G sends the packet, over VNE link 310G, to VNE router 306H where the flow terminates. Subsequently, a NMS determines that the three events (i.e., link 310E, TE tunnel 314, and GRE tunnel 312 each becoming unavailable) are correlated. In response to this determination, the NMS may perform some functions to resolve the situation and/or simply notify a network administrator of the correlation.

A difference between the example scenario in FIG. 2 and the example scenario in FIG. 3 is that, even if a layer 3 (IP) VNE cloud is generated in the latter scenario for unmanaged network 302, there is no way to traverse the VNE cloud because traffic can be sent through TE tunnel 314 to P router 306F without going through link 310E. A further difference is that unmanaged network 302 is an MPLS network and that the logical links can be tunnels. When using traffic engineering, the path traversed by the packet is explicitly determined by the tunnel creator at the time of tunnel creation, thereby bypassing any routing protocol. When simulating TE tunnels, the network is explicitly traversed along the TE tunnels because no routing decisions need to be made. Thus, traffic engineering circumvents layer 3 logic. Any logic performed in a layer 3 VNE cloud would be overridden by anything that is defined for a traffic engineering tunnel. In other words, in situations where an entity (such as a tunnel) overrides routing and/or switching logic, problems arise in correlating through a layer 3 cloud because the rules inside the layer 3 cloud no longer apply for such an entity.

2.8 Additional Benefits

There may be situations where a flow traverses an unmanaged segment and the specific root cause of one or more generated events cannot be known. For example, in FIG. 2, router 206D shuts down. As a result, no links from the managed portion of network 200 to unmanaged network 202 become unavailable. However, in an embodiment, data may be stored that indicates that VNE unmanaged network 202 has been traversed by VNE logical link 214B and access to VNE unmanaged network 202 was attempted by VNE routers 206B and 206F. The data may indicate that unmanaged network 202 is a likely cause of BGP link 212 becoming unavailable. If it is known the provider to which unmanaged network 202 belongs, then that provider may be notified of the potential problem.

3.0 Implementation Mechanisms—Hardware Overview

Figure 4:
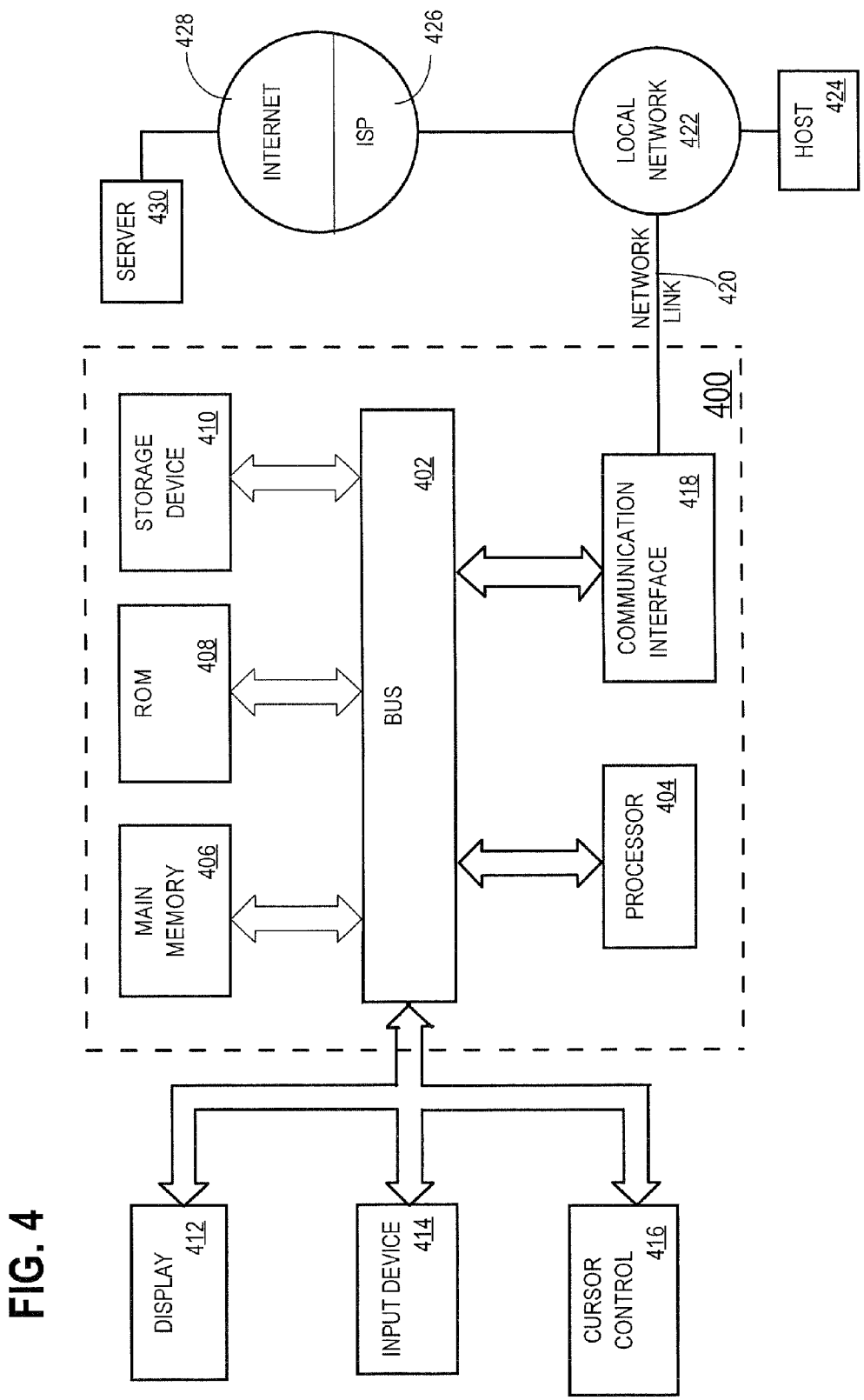
FIG. 4 depicts a computer system upon which an embodiment of the invention may be implemented.

FIG. 4 is a block diagram that depicts a computer system 400 upon which an embodiment of the invention may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, embodiments of the invention have been described with reference to numerous specific details that may vary from implementation to implementation. For example, applications other than event correlation may use logical topological links in a virtual network to bypass unmanaged segments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim 1n any way. The specification and drawings are, accordingly, to be regarded in an illustrative rather than a restrictive sense.

What is claimed is:

1. A network simulator comprising:
a virtual network that models a network that comprises one or more managed portions and one or more unmanaged portions;
wherein the virtual network comprises a plurality of virtual network elements (VNEs) that correspond to a plurality of network elements in the network;
logic encoded in one or more non-transitory tangible media for execution and, when executed, operable to perform:
receiving first data that indicates an event occurred in the network;
in response to the first data, initiating a network flow at a source VNE corresponding to a source network device toward a destination VNE corresponding to a destination network device;
traversing one or more first physical topological links between the source VNE and the destination VNE;
before the network flow arrives at the destination VNE, determining that a first VNE is communicatively coupled to a particular VNE in a portion of the virtual network and that a physical topological link from the first VNE toward the destination VNE is not available, wherein the particular VNE corresponds to an unmanaged portion of the one or more unmanaged portions of the network;
in response to the determining that the first VNE is communicatively coupled to the particular VNE and that a physical topological link from the first VNE toward the destination VNE is not available, identifying and traversing a logical topological link to a second VNE;
after traversing the logical topological link to the second VNE, identifying second data that is associated with the unmanaged portion of the network; and
storing, in association, the first data and the second data.

2. The network simulator of claim 1, wherein the event is a logical link between the source network device and the destination network device in the network becoming unavailable.

3. The network simulator of claim 1, wherein storing the first data and the second data includes determining that a network event reflected in the second data is a cause of a network event reflected in the first data.

4. The network simulator of claim 1, wherein the logic includes additional logic that, when executed, is further operable to perform: before identifying the second data, traversing one or more second physical topological links from the second VNE toward the first VNE.

5. The network simulator of claim 1, wherein the logic includes additional logic that, when executed, is further operable to perform:
for each physical topological link of the one or more physical topological links, determining whether a VNE, at which said each physical topological link is identified, includes third data that indicates a logical topological link from the VNE to another VNE; and
when the VNE includes the third data, storing, in association with the network flow, an identifier of the VNE.

6. The network simulator of claim 1, wherein a topology of the plurality of VNEs is equivalent to a topology of the plurality of network elements.

7. The network simulator of claim 1, wherein each VNE in the plurality of VNEs is associated with the same routing logic as is stored in the network element that corresponds to said each VNE.

8. The network simulator of claim 1, wherein each VNE in the plurality of VNEs is associated with the same historical information as is stored in the network element that corresponds to said each VNE.

9. A method comprising:
receiving first data that indicates an event occurred in the network, wherein the network comprises one or more managed portions and one or more unmanaged portions;
wherein a virtual network models the network;
wherein the virtual network comprises a plurality of virtual network elements (VNEs) that correspond to a plurality of network elements in the network;
in response to the first data, initiating a network flow at a source VNE corresponding to a source network device toward a destination VNE corresponding to a destination network device;
traversing one or more first physical topological links between the source VNE and the destination VNE;
before the network flow arrives at the destination VNE, determining that a first VNE is communicatively coupled to a particular VNE in a portion of the virtual network and that a physical topological link from the first VNE toward the destination VNE is not available, wherein the particular VNE corresponds to an unmanaged portion of the one or more unmanaged portions of the network;
in response to the determining that the first VNE is communicatively coupled to the particular VNE and that a physical topological link from the first VNE toward the destination VNE is not available, identifying and traversing a logical topological link to a second VNE;
after traversing the logical topological link to the second VNE, identifying second data that is associated with the unmanaged portion of the network; and
storing, in association, the first data and the second data;
wherein the method is performed by one or more computing devices.

10. The method of claim 9, wherein the event is a logical link between the source network device and the destination network device in the network becoming unavailable.

11. The method of claim 9, wherein storing the first data and the second data includes determining that a network event reflected in the second data is a cause of a network event reflected in the first data.

12. The method of claim 9, further comprising, before identifying the second data, traversing one or more second physical topological links from the second VNE toward the first VNE.

13. The method of claim 9, further comprising:
for each physical topological link of the one or more physical topological links, determining whether a VNE, at which said each physical topological link is identified, includes third data that indicates a logical topological link from the VNE to another VNE; and
when the VNE includes the third data, storing, in association with the network flow, an identifier of the VNE.

14. The network of claim 9, wherein a topology of the plurality of VNEs is equivalent to a topology of the plurality of network elements.

15. The method of claim 9, wherein each VNE in the plurality of VNEs is associated with the same routing logic as is stored in the network element that corresponds to said each VNE.

16. The method of claim 9, wherein each VNE in the plurality of VNEs is associated with the same historical information as is stored in the network element that corresponds to said each VNE.

17. One or more non-transitory computer-readable storage medium storing instructions which, when executed by one or more processors, causes the performance of the steps of:
receiving first data that indicates an event occurred in the network, wherein the network comprises one or more managed portions and one or more unmanaged portions;
wherein a virtual network models the network;
wherein the virtual network comprises a plurality of virtual network elements (VNEs) that correspond to a plurality of network elements in the network;
in response to the first data, initiating a network flow at a source VNE corresponding to a source network device toward a destination VNE corresponding to a destination network device;
traversing one or more first physical topological links between the source VNE and the destination VNE;
before the network flow arrives at the destination VNE, determining that a first VNE is communicatively coupled to a particular VNE in a portion of the virtual network and that a physical topological link from the first VNE toward the destination VNE is not available, wherein the particular VNE corresponds to an unmanaged portion of the one or more unmanaged portions of the network;
in response to the determining that the first VNE is communicatively coupled to the particular VNE and that a physical topological link from the first VNE toward the destination VNE is not available, identifying and traversing a logical topological link to a second VNE;
after traversing the logical topological link to the second VNE, identifying second data that is associated with the unmanaged portion of the network; and
storing, in association, the first data and the second data.

18. The one or more non-transitory computer-readable storage medium of claim 17, wherein the event is a logical link between the source network device and the destination network device in the network becoming unavailable.

19. The one or more non-transitory computer-readable storage medium of claim 17, wherein storing the first data and the second data includes determining that a network event reflected in the second data is a cause of a network event reflected in the first data.

20. The one or more non-transitory computer-readable storage medium of claim 17, wherein execution of the instructions by the one or more processors further cause the one or more processors to perform the step of, before identifying the second data, traversing one or more second physical topological links from the second VNE toward the first VNE.

21. The one or more non-transitory computer-readable storage medium of claim 17, wherein execution of the instructions by the one or more processors further cause the one or more processors to perform the steps of:
for each physical topological link of the one or more physical topological links, determining whether a VNE, at which said each physical topological link is identified, includes third data that indicates a logical topological link from the VNE to another VNE; and
when the VNE includes the third data, storing, in association with the network flow, an identifier of the VNE.

22. The one or more non-transitory computer-readable storage medium of claim 17, wherein a topology of the plurality of VNEs is equivalent to a topology of the plurality of network elements.

23. The one or more non-transitory computer-readable storage medium of claim 17, wherein each VNE in the plurality of VNEs is associated with the same routing logic as is stored in the network element that corresponds to said each VNE.

24. The one or more non-transitory computer-readable storage medium of claim 17, wherein each VNE in the plurality of VNEs is associated with the same historical information as is stored in the network element that corresponds to said each VNE.

25. An apparatus comprising:
one or more processors;
means for receiving first data that indicates an event occurred in the network, wherein the network comprises one or more managed portions and one or more unmanaged portions;
wherein a virtual network models the network;
wherein the virtual network comprises a plurality of virtual network elements (VNEs) that correspond to a plurality of network elements in the network;
means for initiating, in response to the first data, a network flow at a source VNE corresponding to a source network device toward a destination VNE corresponding to a destination network device;
means for traversing one or more first physical topological links between the source VNE and the destination VNE;
means for determining, before the network flow arrives at the destination VNE, that a first VNE is communicatively coupled to a particular VNE in a portion of the virtual network and that a physical topological link from the first VNE toward the destination VNE is not available, wherein the particular VNE corresponds to an unmanaged portion of the one or more unmanaged portions of the network;
means for identifying and traversing, in response to the determining that the first VNE is communicatively coupled to the particular VNE and that a physical topological link from the first VNE toward the destination VNE is not available, a logical topological link to a second VNE;

means for identifying, after traversing the logical topological link to the second VNE, second data that is associated with the unmanaged portion of the network; and means for storing, in association, the first data and the second data.

26. The apparatus of claim 25, wherein the event is a logical link between the source network device and the destination network device in the network becoming unavailable.

\* \* \* \* \*